Jan. 15, 1935.  H. L. HAMILTON  1,987,620
AUTOMATIC LUBRICATION
Original Filed March 12, 1921

INVENTOR
Harold L. Hamilton
BY
ATTORNEYS

Patented Jan. 15, 1935

1,987,620

UNITED STATES PATENT OFFICE 1,987,620

AUTOMATIC LUBRICATION

Harold Louis Hamilton, Cleveland, Ohio, assignor, by mesne assignments, to Auto Research Corporation, a corporation of Delaware Original application March 12, 1921, Serial No. 451,910. Divided and this application June 11, 1934, Serial No. 729,973

29 Claims. (Cl. 184—7)

My invention relates to a means to automatically deliver a lubricant to various parts required to be lubricated in a machine and more particularly is designed for lubricating various elements in the chassis of a motor driven vehicle and to be driven from any convenient movable part appurtenant to the chassis, or which may be actuated by hand or foot operation.

An object of the invention is to provide means whereby a lubricant will be discharged in measured quantities through the medium of graduating feed means, and directed to the several parts to be lubricated in quantities and at intervals suiting the requirements of particular parts.

A further object of the invention is to provide a source of lubricant pressure and supply, co-acting with the graduating means to supply the same, said source and graduating means functioning by coordinated operations to intermittently deliver the oil in predetermined quantities to the parts to be lubricated.

The invention furthermore has for an object to provide an intermittently acting graduating feed valve actuated by the oil supplied thereto under pressure and arranged to automatically restore its parts after an operation by the received oil.

More specifically the invention has for an object to provide lubricating means of the type referred to reflecting practical considerations with respect to convenience of installation, adjustment and control and making for the maximum efficiency in effecting the lubrication of the parts without discharging to the parts a surplus of lubricant.

Reference is to be had to the accompanying drawing forming a part of this specification, it being understood that the drawing is merely illustrative of one example of the invention.

Figure 1:
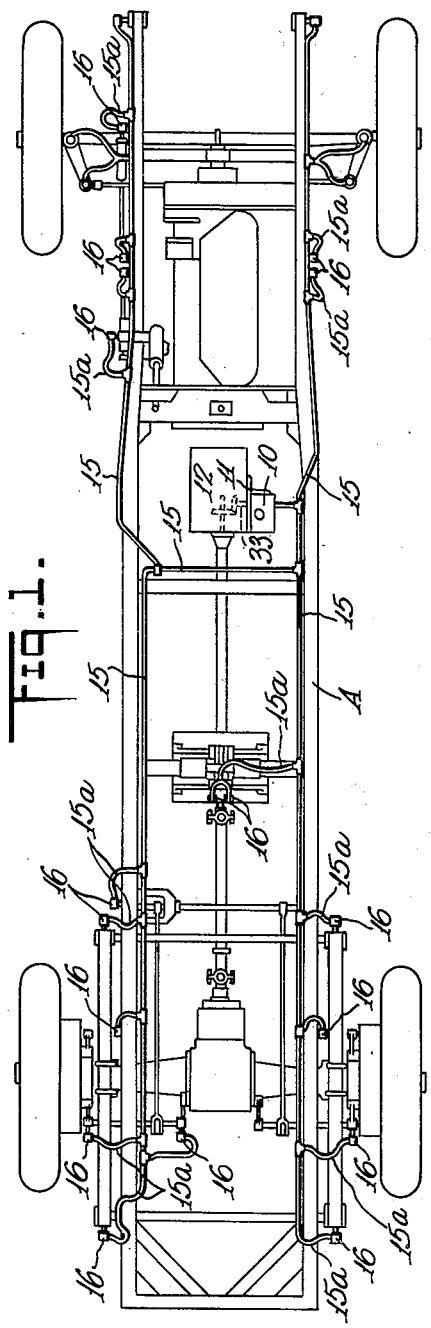
Fig. 1 is a diagrammatic plan view of a chassis equipped with my improved lubricating means.

In carrying out my invention in practice in the illustrated form a reservoir designated generally by the numeral 10 is provided and suitably mounted on the chassis to be driven by a rotary element thereon, there being shown in Fig. 1 a supporting bracket 11 secured to the case of the transmission designated generally by the numeral 12.

The oil from the reservoir is caused to pass through an outlet valve and into the system of distributing pipes 15 with their necessary branches 15a leading to graduating valves 16 associated with the various parts to be lubricated and functioning to pass measured quantities of the lubricant to said parts. The respective measuring valves 16 have each an inlet here shown as in the form of a threaded nipple 17 to which the pipes 15 or branches 15a thereof lead.

The drive means for the pressure pump in the reservoir 10 may include a shaft 33 having driving connection, for example, with an element of the transmission mechanism.

Figure 2:
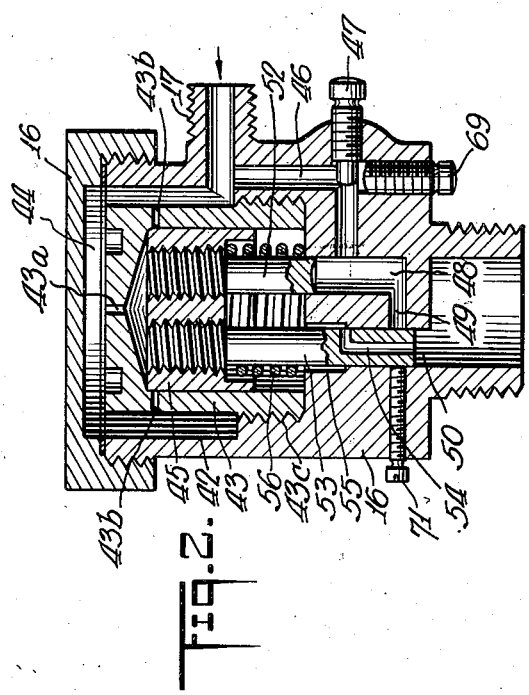
Fig. 2 is a longitudinal section of the graduating valve for passing the lubricant in predetermined quantities to the parts to be lubricated.

The graduating valve 16, as shown in Fig. 2, includes a body or casing 42 into which the inlet 17 leads. In said casing at the top is a cylinder 43 spaced from the wall of the casing 42 to form an oil chamber 44 above and at the sides of said cylinder. The cylinder is shown as screwed into the body of the valve as at 43c. A port 43a leads from the chamber 44 through the top of the cylinder to the interior thereof above or in front of a piston 45 operating in said cylinder and a port or ports 43b lead laterally from the chamber 44 into the interior of the cylinder and have in practice a capacity greater than the port 43a. The oil from the inlet 17, in addition to flowing into the chamber 44 to the front of the piston passes also in the opposite direction through an L-shaped port 46 controlled by a regulating valve 47 and leading to a cavity 48 below or at the back of the piston 45. From cavity 48 leads a lateral port 49 to a longitudinal bore 50 leading to the outlet to thus discharge to the point or element to be lubricated. In the cavity 48 operates a plug 52 on the back or underside of the piston 45 while a similar plug 53 on the piston at the underside and parallel with the first plug operates in the bore 50.

A spring 56 coiled about the plugs 52, 53 normally tends to raise the piston 45 to a position at the top of the cylinder and closing the lateral ports 43b. The plug 53 has an L-shaped oil passage 54 adapted to come into register temporarily with the port 49 in the downward movement of the piston 45. Said passage 54 in the uppermost position of the piston is in communication with a counterbore 55 at the top of the bore 50 to constitute a drain and suction passage as hereinafter referred to.

In operation, it being understood that the nipple 17, Fig. 2, is connected by a pipe 15 and branch 15a from the distributing valve, oil will enter the chamber 44 and pass through the port 43a to the interior of the cylinder 43 above the piston 45 and since the oil is under pressure, the piston 45 will be slowly moved downwardly against the tension of the spring 56 and the resistance of the oil in the cavity 48, until the port or ports 43b are uncovered, thereby subjecting the front or top of the piston to the full pressure of the oil in the chamber 44. As the piston moves downwardly the plug 52 will finally cut off the L-shaped passage 46 and before the plug 53 closes the port 49 leading to the bore 50 and discharge outlet 51, so that the small quantity of oil remaining in the cavity 48 will be forced through the port 49 through said outlet. The continued downward movement of the piston 45 will cause the plug 53 to cut off the passage 49 from said outlet.

The graduating valve 16, it will be observed, is optionally variable through the medium of the regulating screw 47 to pass predetermined quantities of oil to the cavity 49 and thence to the outlet 51 to suit the lubricating requirements of given parts. The screw 69 of valve 16 is removable for draining and affording a clean-out opening at the bottom.

The screw 71, Fig. 2, is provided for making possible the thorough cleaning of the graduating valve 16 by removing said screw and the screws 47 and 69. Said screw 71 serves also to close the hole drilled through the valve body in forming the passage 49.

The portion of the bore 48' above the inlet port 46' might be made of such close fit as to decrease the tendency to any leakage into the lower portion of the chamber 43' below the piston 45'.

I would state in conclusion that while the illustrated example constitutes a practical embodiment of the invention, I do not limit myself strictly to the mechanical details herein illustrated, since manifestly the same can be considerably varied without departure from the spirit of the invention as defined in the appended claims.

The present application is a division of application Serial No. 451,910, filed March 12th, 1921, which is broadly directed to a lubricating system and is also specifically directed to a lubricating system having a return from the piping to the reservoir.

The present application is particularly directed to the measuring valve or flow controlling units positioned at the outlets of said system and proportioning the flow of lubricant to the various bearings.

Fig. 2 of the present application is identical with Fig. 9 of the prior application and Fig. 1 of the present application is substantially identical with Fig. 1 of said prior application.

The measuring valves of the present application and the lubricating system including the same may of course be utilized for other purposes than for lubricating automotive bearings and may, if desired, be utilized for lubricating machinery.

Having thus described my invention, I claim:

1. In a lubricating means of the class described, a feed valve having an oil chamber, means to supply oil to said chamber under pressure, a cylinder in said valve, a piston in said cylinder, said cylinder being in communication with said chamber at the front of the piston for causing a stroke of the piston by the oil pressure and there being an oil cavity in the valve at the rear of the piston in communication with said piston and an element of smaller diameter on the piston to force oil from said cavity to the valve outlet.

2. A lubricator of the class described having an inlet, an outlet and a chamber adapted to contain oil under pressure, a piston subject to oil pressure for an operative stroke, there being an oil cavity in said lubricator and a passage leading thereto to direct oil to the cavity with the entrance of oil to said chamber, means to regulate the flow of oil to said cavity, and means movable with an operative stroke of the piston to eject oil from said cavity to the outlet.

3. The method of lubricant distribution which consists in feeding from the source of supply to the point of application under relatively low pressure, and utilizing a flow of lubricant under low pressure toward the point of application to apply lubricant under relatively high pressure.

4. An oil discharge unit for association with a lubricating installation and for delivering measured charges of lubricant to a bearing, said unit including a measuring chamber, a member having a portion subjected to pressure for displacement thereby and including plugging means of reduced diameter unitary therewith, urged thereby to seal a flow passage in said unit, in order to prevent emission to the bearing of more than the measured charge, a return stop for the end of said member opposed to the plugging means, a spring coiled about a part of said member and urging it against said stop, said unit also including a cavity charged with oil during the application of pressure and delivering substantially the measured quantity therefrom into said chamber through a port entirely between the ends of the side wall of the chamber.

5. In a central lubricating system, a lubricant measuring device including a body having an inlet port, a cylindrical pressure chamber, a cylindrical measuring chamber, an outlet port and passageways establishing communication among said ports and chambers, reciprocatory pistons in said pressure and measuring chambers adapted to take forward and return strokes, lubricant pressure being supplied to said chambers from said inlet port simultaneously at the beginning of the forward stroke and communication between said measuring chamber and said inlet port being alternately established and cut off incidental to the movement of said pistons, said pistons being operatively connected together and included in a unitary reciprocating structure, and said structure including valve means for cutting off said outlet port during filling of said measuring chamber and opening said port subsequently to the filling of said measuring chamber with its lubricant charge.

6. A unit for controlling the flow of lubricant from a remote source to a bearing, said unit comprising a casting having an inlet between the ends thereof for connection with a source of lubricant pressure and an outlet at an end thereof for communication with a bearing, a plug member threaded into said casting and axially aligned with said outlet, said casting having a stop shoulder axially aligned with said plug, a plunger enclosed between said plug and said stop shoulder, said plunger having an enlarged head determining a shoulder, a spring coiled about a part of said plunger and reacting against said plunger shoulder to urge said plunger away from said outlet, the head of said plunger subjected to pressure applied through the inlet to urge the same against the resistance of its spring to the opposite end of its stroke, the spring subsequently returning said plunger to its initial position, said unit including a measuring chamber, a portion of said plunger closing communication from said chamber to the outlet during the charging of said chamber under pressure from the source, the plunger at one part of its movement closing communication from the inlet to the chamber and opening communication from the chamber to the outlet.

7. A unit for controlling the flow of lubricant from a remote source to a bearing, said unit comprising a casting having an inlet between the ends thereof for connection with a source of lubricant pressure and an outlet at an end thereof for communication with a bearing, a plug member threaded into said casting and axially aligned with said outlet, said casting having a stop shoulder axially aligned with said plug, a plunger enclosed between said plug and said stop shoulder, said plunger having an enlarged head determining a shoulder, a spring coiled about a part of said plunger beyond said head and reacting against said head, and urging said plunger away from said outlet, the head of said plunger subjected to lubricant pressure applied through the inlet to urge the same against the resistance of said spring to the opposite end of its stroke, the spring subsequently returning said plunger to its initial position, said unit including a measuring chamber, a portion of said plunger closing communication from said chamber to the outlet during the charging of said chamber from said inlet, the plunger at one part of its movement closing communication from the inlet to the chamber and opening communication from the chamber to the outlet, and means to provide an increase of effective pressure on said plunger head from the source after the plunger has commenced its stroke away from its stop.

8. In a lubricating installation, a measuring unit comprising a lubricant-tight casing having a lubricant inlet between the ends thereof and an outlet at one end thereof, a flow controlling spring pressed plunger in said unit propelled against the resistance of said spring by pressure derived through said lateral inlet and moving in a path aligned with said outlet.

9. In a lubricating installation, a measurng unit comprising a lubricant-tight casing having a lubricant inlet between the ends thereof and an outlet at one end thereof, a flow controlling spring pressed plunger in said unit propelled against the resistance of said spring by pressure derived through said lateral inlet and moving in a course aligned wth said outlet, said plunger having a relatively large area subjected to the pressure from the inlet, and a relatively smaller portion to plug the outlet from the measuring cavity to the bearing.

10. A flow controlling unit for a lubricating installation, said unit including a casting having a lateral inlet for connection to a source of pressure and having an outlet at one end thereof substantially at right angles to said inlet, a plug member threaded into an end of said casting, a flow controlling plunger in the casting lodged in a chamber therefor, between the end of said plug and a part of said casting, a spring coiled about a part of said plunger and normally urging the same away from said outlet, said plunger subjected to pressure from the source to shift the same against the resistance of said spring, and a measuring chamber in said unit, said plunger in the course of its travel controlling the communication of said chamber with respect to the inlet thereto and the outlet therefrom in order to permit successively charging of said chamber shutting the same off from the inlet and discharging the same toward the bearing.

11. A flow controlling unit for a pressure lubricating system, said unit including a metallic casing having an inlet between the ends thereof, an outlet at one end thereof, a controlling plunger axially aligned with said outlet, and coacting with the inlet and the outlet to control the flow therethrough, a screw plug threaded into said casing and serving as a limiting stop for one end of said plunger, said casing having an annular stop shoulder aligned with said stop and serving to limit the movement of said plunger away from said stop, said plunger having an enlarged head determining a shoulder, a spring coiled about said plunger and between the ends thereof, and urging the same toward the stop therefor, more remote from said outlet, and a cap effecting a pressure-tight closure for the casing.

12. A lubricator of the class described having an inlet and a chamber adapted to contain oil under pressure, a piston subject to oil pressure for an operative stroke, there being an oil cavity in said valve and a passage leading thereto to direct oil to the cavity with the entrance of oil to said chamber, means to regulate the flow of oil to said cavity and means movable with an operative stroke of the piston to eject oil from said cavity to the valve outlet.

13. A lubricant dispensing unit for a bearing to be incorporated in a central lubricating installation comprising a plurality of cylindrical piston chambers of diverse diameters, one of which serves to measure the lubricant charge dispensed to the bearing, cylindrical piston means in said chambers, one of which is positioned in said dispensing chamber to discharge a measured quantity of lubricant to the bearing, inlet and outlet ports associated with said chambers, passages within the unit connecting said chambers and said ports, threaded connections for a passage to a bearing and for conduit means communicating with said ports and passages, said ports, passages and connections being so arranged and constructed that said piston means will be actuated by lubricant pressure applied through said conduit means, that lubricant flow will take place in respect to at least one of said piston chambers both to and from said conduit means and also from said measuring piston chamber to a bearing connection and that smaller cylindrical piston means will serve to open and close those of said ports and connections, establishing communication between said conduit means and said measuring chamber and enable admission and discharge of lubricant to and from said measuring chamber.

14. A lubricant dispensing measuring valve unit to be connected to the conduit system of a central lubricating installation and to be applied at a bearing, said unit comprising a multiple valve body with inlet and outlet means, reciprocating multiple pistons therein of diverse diameters, chambers of similar diverse diameters to receive said pistons, from one of which chambers the corresponding piston serves to eject to a bearing a metered lubricant charge previously received from said conduit system, a smaller of said pistons serving to control the flow of lubricant from said inlet means to said measuring chamber.

15. A lubricant dispensing measuring valve unit to be connected to the conduit system of a central lubricating installation and to be applied at a bearing, said unit comprising a multiple valve body with inlet and outlet means, reciprocating multiple pistons therein of diverse diameters, chambers of similar diverse diameters to receive said pistons from one of which chambers the corresponding piston serves to eject to a bearing a metered lubricant charge previously received from said conduit system, a smaller of said pistons serving to control the flow of lubricant from said inlet means to said measuring chamber, said pistons consisting of cylindrical plungers and said smaller plunger opening and closing port means in the side of the corresponding plunger chamber, which port means is between the ends of said plunger diameter.

16. A lubricant dispensing measuring valve unit to be connected to the conduit system of a central lubricating installation and to be applied at a bearing, said unit comprising a multiple valve body with inlet and outlet means, reciprocating multiple pistons therein of diverse diameters, chambers of similar diverse diameters to receive said pistons from one of which chambers the corresponding piston serves to eject to a bearing a metered lubricant charge previously received from said conduit system, a smaller of said pistons serving to control the flow of lubricant from said inlet means to said measuring chamber, said larger piston chamber being provided with port means and a passage being provided between said port means and said conduit system, said port means serving as both an inlet and an outlet to permit flow of lubricant in either direction between said system and said chamber.

17. A lubricant dispensing measuring valve unit to be connected to the conduit system of a central lubricating installation and to be applied at a bearing, said unit comprising a multiple valve body with inlet and outlet means, reciprocating multiple pistons therein of diverse diameters, chambers of similar diverse diameters to receive said pistons from one of which chambers the corresponding piston serves to eject to a bearing a metered lubricant charge previously received from said conduit system, a smaller of said pistons serving to control the flow of lubricant from said inlet means to said measuring chamber, said smaller piston being moved to one position by lubricant pressure and being spring-returned after cessation of said pressure.

18. A lubricant dispensing measuring valve unit to be connected to the conduit system of a central lubricating installation and to be applied at a bearing, said unit comprising a multiple valve body with inlet and outlet means, reciprocating multiple pistons therein of diverse diameters, chambers of similar diverse diameters to receive said pistons from one of which chambers the corresponding piston serves to eject to a bearing a metered lubricant charge previously received from said conduit system, a smaller of said pistons serving to control the flow of lubricant from said inlet means to said measuring chamber, said unit being provided with inlet and outlet passageways parallel to and communicating with said measuring chamber offset from each other, the flow through said passageways being controlled by said smaller piston.

19. A lubricant dispensing measuring valve unit to be connected to the conduit system of a central lubricating installation and to be applied to a bearing, said unit comprising a multiple valve body with inlet and outlet means, reciprocating multiple pistons therein of diverse diameters, chambers of similar diverse diameters to receive said pistons from one of which chambers the corresponding piston serves to eject to a bearing a metered lubricant charge previously received from said conduit system, a smaller of said pistons serving to control the flow of lubricant from said inlet means to said measuring chamber, said piston and piston chambers having parallel axes, and said multiple pistons including two smaller pistons and one larger piston all moved in the same direction upon application of lubricant pressure.

20. In an automatic lubricating device, the combination of a valve body with an inlet, an outlet, a cylinder of relatively large bore, a reciprocatory piston therein, another cylinder of relatively small bore, a plunger therein and secured to said piston, resilient means within said large cylinder holding said piston against the upper end of said cylinder, a valve controlled passage leading from the lower end of said small cylinder toward said outlet, said valve being operated by said piston, and a port passing through the body of said valve establishing communication between said inlet and outlet.

21. A device for injecting lubricant under pressure comprising a body member having two chambers of different diameters, the larger of said chambers being a cylinder, a piston mounted to reciprocate in said cylinder, a plunger connected with said piston and adapted to reciprocate in the smaller of said chambers, a spring to alternately resist and assist reciprocating movements of said plunger, said body member having an opening to admit fluid pressure into said body beneath said plunger and another opening communicating with said larger chamber near the top thereof and above said piston, the connection of said opening with said smaller chamber being closed by said plunger immediately upon filling of said chamber under lubricant pressure.

22. A valve for connection in a pressure lubricating system including a body formed with a measuring chamber having an inlet at one side and a wall at another side formed with an outlet passage, said inlet and outlet in communication through said chamber, a piston valve in said chamber to cut off the inlet from the outlet passage and arranged to permit the passage of lubricant thereby during a portion only of the forward movement of said piston, means actuated upon movement of said piston to close said outlet toward the end of the forward stroke of the piston, a spring to impart a return movement to the piston, means including a valvular member normally closing said outlet and moved by lubricant pressure to open said outlet, said spring normaly holding said member closing said outlet, said valvular member and piston valve being simultaneously movable by direct line pressure, said valvular member being provided with a cylindrical portion to enter and fill said outlet passage and of extended length to provide for extended movement of said member in opening said outlet.

23. A lubricant flow control fitting adapted to be associated with a bearing and connected to a conduit system, said fitting comprising a cylindrical bore, a plug of slightly smaller diameter than said bore and longitudinally movable therein in one direction upon application of lubricant pressure, resilient means for moving said plug in the opposite direction, and an adjustable restriction to control the flow through said fitting.

24. In a lubricator of the class described, a feed valve adapted to receive oil under pressure, a restricted inlet to said valve to control the oil reception, a piston in said valve subject for an operative stroke to the oil pressure, and means subject to an operation of the piston to eject a predetermined quantity of oil from the valve.

25. A valve for connection in a pressure lubricating system including a casing having an inlet and an outlet, a piston structure in said casing including a part of larger diameter at which piston-propulsive pressure is applied and a part of smaller diameter connected for expulsion of lubricant from the casing, means positioning said piston structure at one extreme of its stroke, said valve being provided with inlet flow passage means through which lubricant pressure is applied to said part of larger diameter, and means to render said inlet flow passage means of increased effectiveness in flow area toward the part of larger diameter for increased effectiveness of pressure communication to the piston after slight movement of the piston away from said extreme of its stroke.

26. A measuring valve for use in a central system of lubrication having a body including an inlet port and an outlet port, a resistance unit to regulate flow of lubricant through the valve positioned between said ports, a receiving and discharging measuring chamber also located between said ports, a plurality of valves in said body regulating the flow through said ports, one valve being inside of said chamber and the other valve being located outside of said chamber, and lubricant pressure actuated means operatively connected to said valves.

27. In a measuring valve for lubricating apparatus of the class described, the combination of a measuring chamber, a chamber of larger cross-section at one end thereof, an inlet for said larger chamber, a valve for cutting off inflow of lubricant to said measuring chamber, a piston in said larger chamber, said piston connected to said valve, spring means in said larger chamber normally holding said valve to open said inlet, an outlet for said measuring chamber, and a discharge valve connected to said piston opening and closing said outlet, said outlet being opened only upon a predetermined movement of said first-named valve at the same time as said first-named valve is moved into said measuring chamber to cut off further flow of lubricant thereinto.

28. In a lubricating means of the class described, a feed valve having an oil chamber, means to supply oil to said chamber under pressure, a cylinder in said valve, a piston in said cylinder, said cylinder being in communication with said chamber at the front of the piston for causing a stroke of the piston by the oil pressure and there being an oil cavity in the valve at the rear of the piston in communication with said piston and an element of smaller diameter on the piston to force oil from said cavity to the valve outlet.

29. A lubricator of the class described having an inlet and a chamber adapted to contain oil under pressure, a piston subject to oil pressure for an operative stroke, there being an oil cavity in said valve and a passage leading thereto to direct oil to the cavity with the entrance of oil to said chamber, means to regulate the flow of oil to said cavity, and means movable with an operative stroke of the piston to eject oil from said cavity to the valve outlet.

HAROLD LOUIS HAMILTON.